J. Sheffield,

Diaphragm Meter,

Nº 40,504.　　　　　Patented Nov. 3, 1863.

Witnesses:

Inventor:
John Sheffield
per Munn & Co.
attys

*Sheet 2 — 2 Sheets.*

J. Sheffield,
Diaphragm Meter,

N° 40,504.  Patented Nov. 3, 1863.

Witnesses:
J. W. Coombs
Geo. B. Rees

Inventor.
John Sheffield
per Munn & Co
attys.

UNITED STATES PATENT OFFICE.

JOHN SHEFFIELD, OF PULTNEYVILLE, NEW YORK.

IMPROVEMENT IN FLUID-METERS.

Specification forming part of Letters Patent No. 40,504, dated November 3, 1863.

*To all whom it may concern:*

Be it known that I, JOHN SHEFFIELD, of Pultneyville, in the county of Wayne and State of New York, have invented a new and Improved Fluid-Meter; and I do hereby declare that the following is a full, clear, and exact description of the same, reference being had to the accompanying drawings, forming a part of this specification, in which—

Figure 1:
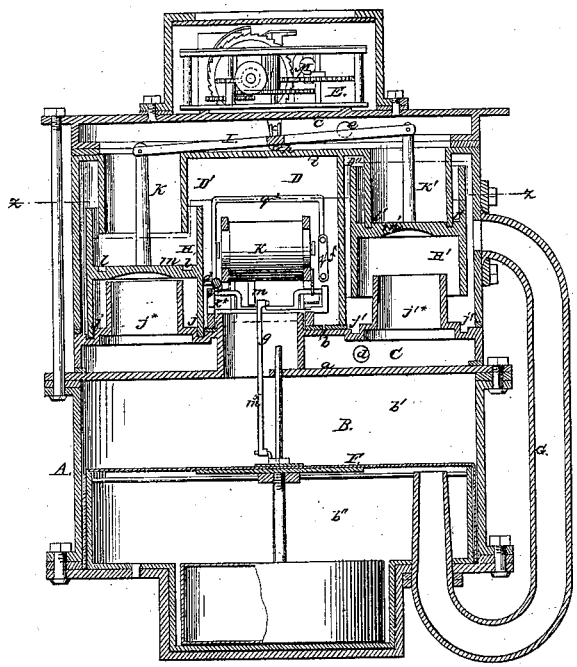
Figure 2:
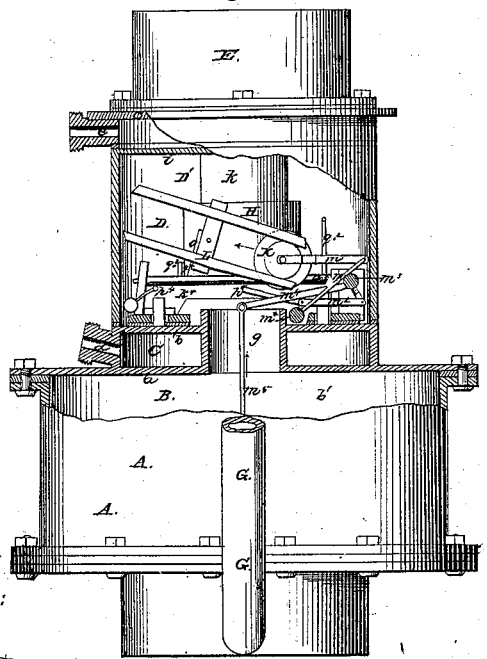
Figure 3:
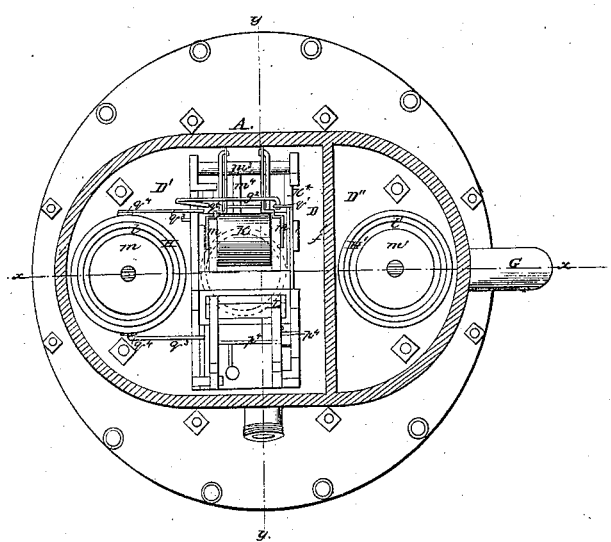
Figure 4:
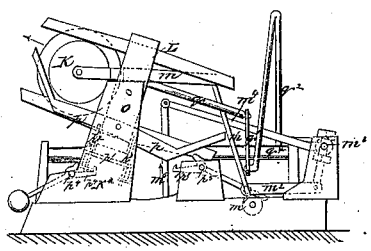

Figure 1 represents a longitudinal vertical section of this invention, taken in the plane indicated by the line $x$ $x$, Fig. 3. Fig. 2 is a sectional side elevation of the same, the parts in section being bisected in a plane indicated by the line $y$ $y$, Fig. 3. Fig. 3 is a horizontal section of the same, the line $z$ $z$, Fig. 1, indicating the plane of section. Fig. 4 is a side elevation of the mechanism for changing the position of the valves.

Similar letters of reference in the several views indicate corresponding parts.

This invention consists in the employment or use of a movable weight guided by an oscillating slide, which connects with one of two valves, that are balanced on a suitable working-beam and change the current of the fluid, and moved by the action of the fluid on a flexible or movable diaphragm in such a manner that by the motion of the weight produced by the action of the fluid on the diaphragm the valves are alternately closed and opened and the current of the fluid changed to act alternately on one and then on the other side of the diaphragm, and the quantity of fluid admitted to either side of the diaphragm is registered by the motion of the working-beam, from which the valves are suspended, said motion being transmitted by suitable mechanism to a registering apparatus, so that the quantity of fluid passing or having passed through the meter can be ascertained at any moment.

To enable those skilled in the art to make and use my invention, I will proceed to describe its construction and operation.

A represents a case, made of sheet metal, cast-iron, or any other suitable material, according to the pressure to which it may be exposed when in operation.

If the meter is to be used for water or other non-compressible fluids passing through under a high pressure, the case will best be made of cast-iron; but for gas or other compressible fluids, which are generally measured at a very low pressure, the case may be made of tinned sheet-iron, sheet-brass, or other light material.

The case A is divided into four compartments or chambers, B C D E, by partitions $a$ $b$ $c$. The chamber B contains the diaphragm F, which may be either fast at the circumference and flexible, so that its center is free to receive a reciprocating motion, or which may be rigid and fitted into the chamber like a piston or plunger, to assume a reciprocating motion if acted upon by competent power. The second chamber, C, connects with the supply-pipe $d$. The third chamber, D, contains the valves and the mechanism for changing the same, and communicates with the discharge-pipe $e$, and the fourth or last compartment, E, contains the registering apparatus.

A transverse partition, $f$, divides the valve-chamber D in two compartments, D′ D″, and the compartment D′ connects by a central channel, $g$, with the space $b'$ on one, and the compartment D″ through a curved pipe, G, G, with the space $b''$ on the opposite side of the diaphragm F.

H H′ are the valves which are suspended from a rock-shaft, I, that has its fulcrum on a pivot, $h$, secured in lugs projecting from a partition, $i$, in the top part of the valve-chamber. The two valves are perfectly balanced, so that a slight pressure exerted on one end of the rock-shaft, or on one of the valves, causes the same to descend and produces a corresponding ascent in the valve at the opposite end.

The valves are so constructed that the same when lowered dip into grooves $j$ $j'$, containing mercury or other suitable liquid to make a water or gas tight joint, and to close the apertures $j^*$ $j'^*$, in the partition $b'$, and when the valves rise the edges of two annular flanges, $k$ $k'$, projecting from the partition $i$, dip into grooves $l$ $l'$, made in the central bottoms or heads, $m$ $m'$, of the valves, as clearly shown in Fig. 1 of the drawings, where the valve H closes down in the groove $j$ and the valve H′ against the annular flange $k'$. In this position the supply-pipe $d$ communicates through the apertures $j'$, compartment D″, and curved pipe G with the space $b''$ on the outside of the diaphragm, and the space $b'$ on the inside of the diaphragm communicates through the central channel, D, and annular flange $k$ with the discharge-pipe $e$. If water or other fluid is admitted through the supply-pipe, the compartment $b''$ begins to fill, the diaphragm moves in the direction of the arrow marked near it in Fig. 1, and any fluid contained in the compartment $b'$ is forced out through the discharge-pipe.

The valves are changed by the action of a weight, K, which is hung in two arms, $m$, which connect by levers $m'$ with a rock-shaft, $m^*$. This rock-shaft connects by two arms and a link, $m^2$, with a rock-shaft, $m^3$, and an arm, $m^4$, extending from this rock-shaft, connects by a rod, $m^5$, with the center of the diaphragm, F.

The rock-shafts $m^*$ and $m^3$ have their bearings in a frame, $K^*$, bolted down upon the partition $b$, and the arms and levers on the same are so proportioned that a motion of the diaphragm and rod $m^5$ in the direction of the arrows marked near to said rod in Figs. 2 and 4 produces a motion of the weight in the direction of the arrow marked near it in the same figures. The weight K is guided by a slide or slides, L, and this guide is pivoted in its center to standards $o$, rising from the frame $K^*$, so that as soon as the weight passes its fulcrum said guide has a tendency to assume an inclined position. It is, however, not allowed to follow this tendency until by the action of the weight on a tappet, $p$, and through it on dogs $p^*$ $p'^*$ the double-hooked catch $p'$, at the bottom part of the guide L, is released from that one of the dogs which retains it at a certain moment. The tappet $p$ is pivoted to the side of the guide L, and its ends are turned up, so that the weight, on arriving at the ends of the guide, depresses the tappet and acts by means of one of the rods $p^2$ $p^3$, on either one of the dogs $p^*$ $p'^*$, and by depressing said dogs releases the guide and allows it to follow the action of the weight.

The dogs $p^*$ $p'^*$ are connected to rock-shafts $p^4$, $p^5$ and held in the proper position to retain the catch $p'$ by suitable weights or springs. The guide L connects by an arm, $q$, link $q'$, and bent arm $q^2$ with a rock-shaft, $q^*$, from which two arms, $q^3$, extend, (see Fig. 3,) one on either side of the valve H, and these arms connect by links $q^4$ with said valve. The connection between the guide L and valve H is of such a nature that when the weight is in the position shown in Fig. 2 the valve H is depressed, and when the weight comes to the opposite end of the guide it raises the valve H and the valve H' is depressed.

The operation of the working parts of the meter will now be readily understood. If the valve H is down and the valve H' up, as shown in Fig. 1, and the fluid is admitted, the compartment $b''$ fills and the diaphragm F rises. The position of the weight K is thereby changed from one end of the guide to the other, and the valve H is raised, and, consequently, the valve H' depressed. The fluid now passes into the compartment $b'$, the diaphragm is depressed, and the fluid contained in the compartment $b''$ is forced out through the pipe G and discharge-pipe $e$. When the diaphragm reaches its lowest position, the valves are again changed, and so on until the flow of the fluid is stopped. The rock-shaft I, from which the valves H H' are suspended, acts by a fork, $i^*$, on an arm projecting from a vertical rock-shaft, $r$, which transmits the motion of the valves to the registering apparatus M. If the capacity of the compartments $b'$ $b''$ is known, the quantity of fluid which passes through the apparatus can be readily ascertained by marking the number of strokes of the valves, which office is performed by the registering apparatus in the manner above pointed out.

The operation of this meter is perfectly sure, no fluid can possibly pass through without being measured, and it can be made to work equally well for measuring fluids at a high and at a low pressure.

What I claim as new, and desire to secure by Letters Patent, is—

1. The weight K and tilting guide L, in combination with the diaphragm F, valves H H', rock-shaft I, and registering apparatus M, constructed and operating in the manner and for the purpose substantially as shown and described.

2. The tappet $p$, hinged to the side of the tilting guide L, and operating in combination with the weight K, double-hooked catch $p'$, and dogs $p^*$ $p'^*$, substantially as and for the purpose set forth.

JOHN SHEFFIELD.

Witnesses:
W. I. THROOP,
H. M. GRIFFEN.